US012775148B2

(12) United States Patent
Rodriguez

(10) Patent No.: US 12,775,148 B2
(45) Date of Patent: Oct. 27, 2026

(54) TRAY ASSEMBLY FOR MAKING FIBER OPTIC CONNECTIONS AND ASSOCIATED METHOD

(71) Applicant: CORNING RESEARCH & DEVELOPMENT CORPORATION, Corning, NY (US)

(72) Inventor: Diana Rodriguez, Mansfield, TX (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 315 days.

(21) Appl. No.: 18/589,973

(22) Filed: Feb. 28, 2024

(65) Prior Publication Data

US 2024/0310595 A1 Sep. 19, 2024

Related U.S. Application Data

(60) Provisional application No. 63/451,757, filed on Mar. 13, 2023.

(51) Int. Cl.

| | |
|---|---|
| ***G02B 6/02*** | (2006.01) |
| ***G02B 6/036*** | (2006.01) |
| ***G02B 6/44*** | (2006.01) |

(52) U.S. Cl.
CPC ..... *G02B 6/44524* (2023.05); *G02B 6/02042* (2013.01); *G02B 6/03611* (2013.01); *G02B 6/4455* (2013.01)

(58) Field of Classification Search
CPC ............ G02B 6/03611; G02B 6/02042; G02B 6/0281; G02B 6/03627; G02B 6/0365; G02B 6/4455; G02B 6/4453; G02B 6/44526
See application file for complete search history.

(56) References Cited

U.S. PATENT DOCUMENTS

| | | | | |
|---|---|---|---|---|
| 6,608,765 B2 * | 8/2003 | Vier | H05K 7/1429 361/752 |
| 2008/0087621 A1 * | 4/2008 | Zang | A47B 57/20 211/187 |
| 2009/0274429 A1 * | 11/2009 | Krampotich | H04Q 1/023 385/135 |
| 2010/0037525 A1 * | 2/2010 | Sato | E05B 17/0025 74/89.17 |
| 2023/0333345 A1 * | 10/2023 | Takeda | G02B 6/44526 |

* cited by examiner

*Primary Examiner* — Eric Wong
(74) *Attorney, Agent, or Firm* — Kapil U. Banakar

(57) ABSTRACT

A tray assembly for organizing cables includes a tray, at least one retainer coupled to the tray and configured to receive and retain an adapter assembly, and at least one tray rail coupled to the tray. The tray rail includes a first latch and a second latch that each have a first end and a second end. The tray rail also includes first and second biasing members for biasing the second end of the first and second latches, respectively, to an engaged position, wherein the respective first ends are movable to move the respective second ends to a disengaged position. A method of installing fiber optic cables using the tray is also disclosed.

14 Claims, 9 Drawing Sheets

TRAY ASSEMBLY FOR MAKING FIBER OPTIC CONNECTIONS AND ASSOCIATED METHOD

PRIORITY APPLICATION

This application claims the benefit of priority of U.S. Provisional Application No. 63/451,757, filed on Mar. 13, 2023, the content of which is relied upon and incorporated herein by reference in its entirety.

TECHNICAL FIELD

The invention relates generally to fiber optic connectivity, and more specifically to tray assemblies for facilitating the connection of fiber optic cables in a fiber optic network.

BACKGROUND

The large amount of data and other information transmitted over the internet has led businesses and other organizations to develop large scale data centers for organizing, processing, storing and/or disseminating large amounts of data. Data centers contain a wide range of network equipment including, for example, servers, networking switches, routers, storage subsystems, etc. Data centers further include a large amount of cabling and equipment racks to organize and interconnect the network equipment in the data center. Modern data centers may include multi-building campuses having, for example, one primary or main building and a number of auxiliary buildings in close proximity to the main building. All the buildings on the campus are interconnected by a local fiber optic network.

Data center design and cabling-infrastructure architecture are increasingly large and complex. To manage the interconnectivity of a data center, the network equipment within the buildings on the data center campus is often arranged in structured data halls having a large number of spaced-apart rows. Each of the rows is, in turn, configured to receive a number of equipment racks or cabinets (e.g., twenty racks or cabinets) which hold the network equipment. In some data center architectures, each of the rows includes an intermediate distribution frame (sometimes referred to as a main patch panel) at a front or head end of the row. Distribution cables with a relatively large number of optical fibers (high fiber counts) are routed from a building distribution frame to the intermediate distribution frames for the different rows of equipment racks. At the intermediate distribution frames, a large number of distribution fiber optic cables with lower fiber counts are connected to the optical fibers of the associated high fiber count distribution cable(s) and routed along the row to connect to the network equipment held in the various racks in the row. To organize the large number of in-row distribution fiber optic cables, each row typically includes a cable tray or basket disposed above the row for supporting the distribution fiber optic cables as they extend along the row. The network equipment in the racks is optically connected to the distribution fiber optic cables by technicians during the construction of the data center using a large number of jumper cables.

Installing the relatively large number of optical fibers from the distribution cables into the intermediate distribution frames and routing that large number of optical fibers via row distribution cables to the network equipment in the racks may take considerable installation time, manual labor, and costs. What is needed is an efficient cabling-infrastructure to reduce time and manual labor to install the optical fibers leading to and from the intermediate distribution frames.

SUMMARY

In one aspect of the disclosure, a tray assembly for organizing cables is disclosed. The tray assembly includes a tray, at least one retainer coupled to the tray and configured to receive and retain an adapter assembly, and at least one tray rail coupled to the tray. The tray rail has a first latch and a second latch, each of the first and second latches has a first end and a second end. The tray rail also has first and second biasing members for biasing the second end of the first and second latches, respectively, to an engaged position. The respective first ends may be moved to place the respective second ends in a disengaged position.

In one embodiment, the at least one retainer includes two opposed retainers coupled to the tray. Each of the two retainers may have a retainer member configured to engage opposing sides of the adapter assembly when it is installed in the tray assembly.

In one embodiment, the tray assembly further includes a plurality of cable routing guides configured to retain at least one cable connected to the adapter assembly. In another embodiment, the biasing member is a flexible member integrally formed in the tray rail.

In one embodiment, the second end of the first latch has notched profile on a forward side and a sloped profile on a rear side and wherein the second end of the second latch has sloped profile on a forward side and a notched profile on a rear side.

In another aspect of the disclosure, an intermediate distribution frame for organizing cables is disclosed. The intermediate distribution frame includes a housing shell, at least one housing rail coupled to the housing shell, each housing rail having at least one recess, and a tray assembly. The tray assembly includes a tray, at least one retainer coupled to the tray and configured to receive and retain an adapter assembly, and at least one tray rail coupled to the tray. The tray rail has a first latch and a second latch where each of the first and second latches has a first end and a second end. The tray rail has first and second biasing members for biasing the second end of the first and second latches, respectively, to an engaged position. The respective first ends may be moved to place the respective second ends in a disengaged position relative to the at least one recess. The tray is moveable along the at least one tray rail such that at least one of the second ends of the first and second latches engages the at least one recess as the tray moves along the at least one tray rail.

In one embodiment, the at least one recess on the at least one tray rail includes first, second, and third spaced apart recesses. The tray is moveable between a first extended position, a resting position, and a second extended position, wherein in the first extended position the second end of the first latch is disposed within the first recess, wherein in the resting position the second end of the first latch is disposed within the second recess and the second end of the second latch is disposed within the third recess, and wherein in the second extended position the second end of the first latch is disposed within the third recess. In one aspect, the at least one tray rail has a front section, a middle section, and a rear section and the first recess is located in the front section, the second recess is located in the middle section, and the third recess is located in the rear section.

In another embodiment, each of the second ends of the first and second latches has forward and rear sides and each of the first, second, and third recesses have respective front and rear sides. In addition, the second end of the first latch has a notched profile on its forward side and a sloped profile on its rear side and the second end of the second latch has a sloped profile on its forward side and a notched profile on its rear side. Further, the first recess has a notched profile on its forward side and a sloped profile on its rear side, the second recess has a sloped profile on its forward side and rear side, and the third recess has a sloped profile on its forward side and a notched profile on its rear side.

In one embodiment, when the tray is in the first extended position, the notched profile of the second end of the first latch engages the notched profile of the first recess such that the tray is restricted from moving further forward without disengaging the second end of the first latch from the first recess. Similarly, when the tray is in the resting position, the notched profile of the second end of the second latch engages the notched profile of the third recess such that the tray is restricted from moving further rearward without disengaging the second end of the second latch from the third recess.

In another aspect of the disclosure, a method for installing cables in an intermediate distribution frame is disclosed. The method includes providing an intermediate distribution frame having a housing shell, at least one housing rail coupled to the housing shell, and a tray moveable along the housing rail. The tray has at least one retainer configured to receive and retain an adapter assembly. The method further includes moving the tray in a first direction at least partially out of one side of the housing shell, installing an adapter assembly having cables attached to one side of the adapter assembly into the at least one retainer, and moving the tray in a second direction opposite the first direction so as to position the tray back into the housing shell.

In one embodiment, the tray includes a tray rail having at least one latch configured to engage the housing rail to fix the tray in a position relative to the housing rail and the method further includes prior to moving the tray in the first direction, releasing the latch from the housing rail and moving the tray in the first direction to an extended position.

In one embodiment, the method further includes moving the tray in the second direction at least partially out of the opposite side of the housing shell, connecting cables to the opposite side of the adapter assembly, and moving the track in the first direction to position the tray back into the housing shell.

In one embodiment, the tray includes a tray rail having at least one latch configured to engage the housing rail to fix the tray in a position relative to the housing rail, wherein moving the tray in the second direction includes moving the tray in the second direction until the at least one latch engages the housing rail to restrict further movement of the tray in the second direction.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1:
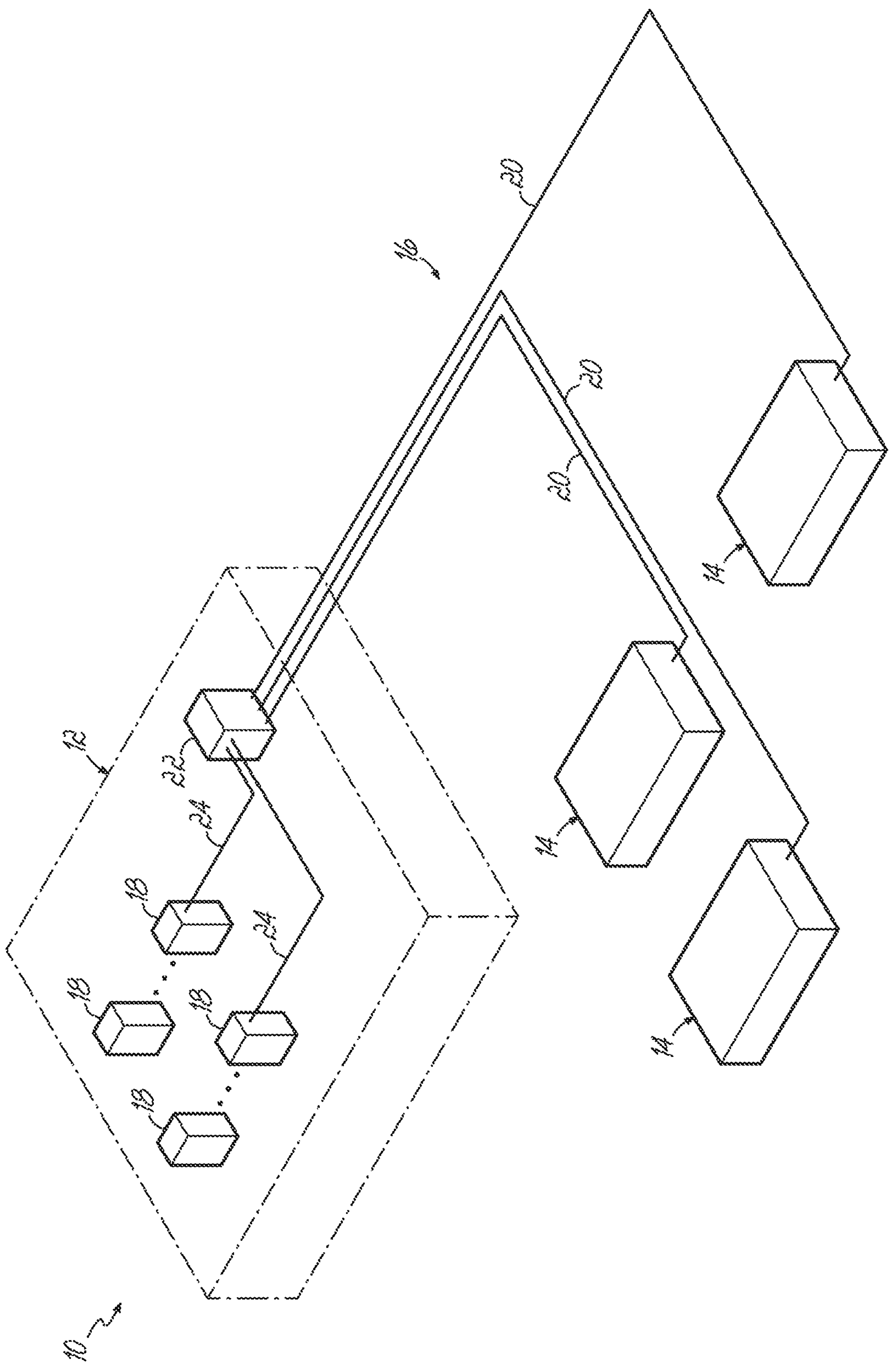
FIG. 1 is a schematic illustration of a data center campus according to an exemplary embodiment of the disclosure.

As illustrated in FIG. 1, a modern-day data center 10 may include a collection of buildings (referred to as a data center campus) having, for example, a main building 12 and one or more auxiliary buildings 14 in close proximity to the main building 12. While three auxiliary buildings are shown, there may be more or less depending on the size of the campus. The data center 10 provides for a local fiber optic network 16 that interconnects the auxiliary buildings 14 with the main building 12. The local fiber optic network 16 allows network equipment 18 in the main building 12 to communicate with various network equipment (not shown) in the auxiliary buildings 14. In the exemplary embodiment shown, the local fiber optic network 16 includes trunk cables 20 extending between the main building 12 and each of the auxiliary buildings 14. Conventional trunk cables 20 generally include a high fiber-count arrangement of optical fibers for passing data and other information through the local fiber optic network 16. In the example illustrated in FIG. 1, the trunk cables 20 from the auxiliary buildings 14 are routed to one or more distribution cabinets 22 housed in the main building 12 (one shown).

Within the main building 12, a plurality of indoor fiber optic cables 24 ("indoor cables 24") are routed between the network equipment 18 and the one or more distribution cabinets 22. The indoor cables 24 generally include a high fiber-count arrangement of optical fibers for passing data and other information from the distribution cabinets 22 to the network equipment 18. Although only the interior of the main building 12 is schematically shown in FIG. 1 and discussed above, each of the auxiliary buildings 14 may house similar equipment for similar purposes. Thus, although not shown, each of the trunk cables 20 may be routed to one or more distribution cabinets 22 in one of the auxiliary buildings 14 in a manner similar to that described above. Furthermore, each of the auxiliary buildings 14 may include indoor cables 24 that extend between network equipment 18 and the one or more distribution cabinets 22 of the auxiliary building 14.

Figure 2:
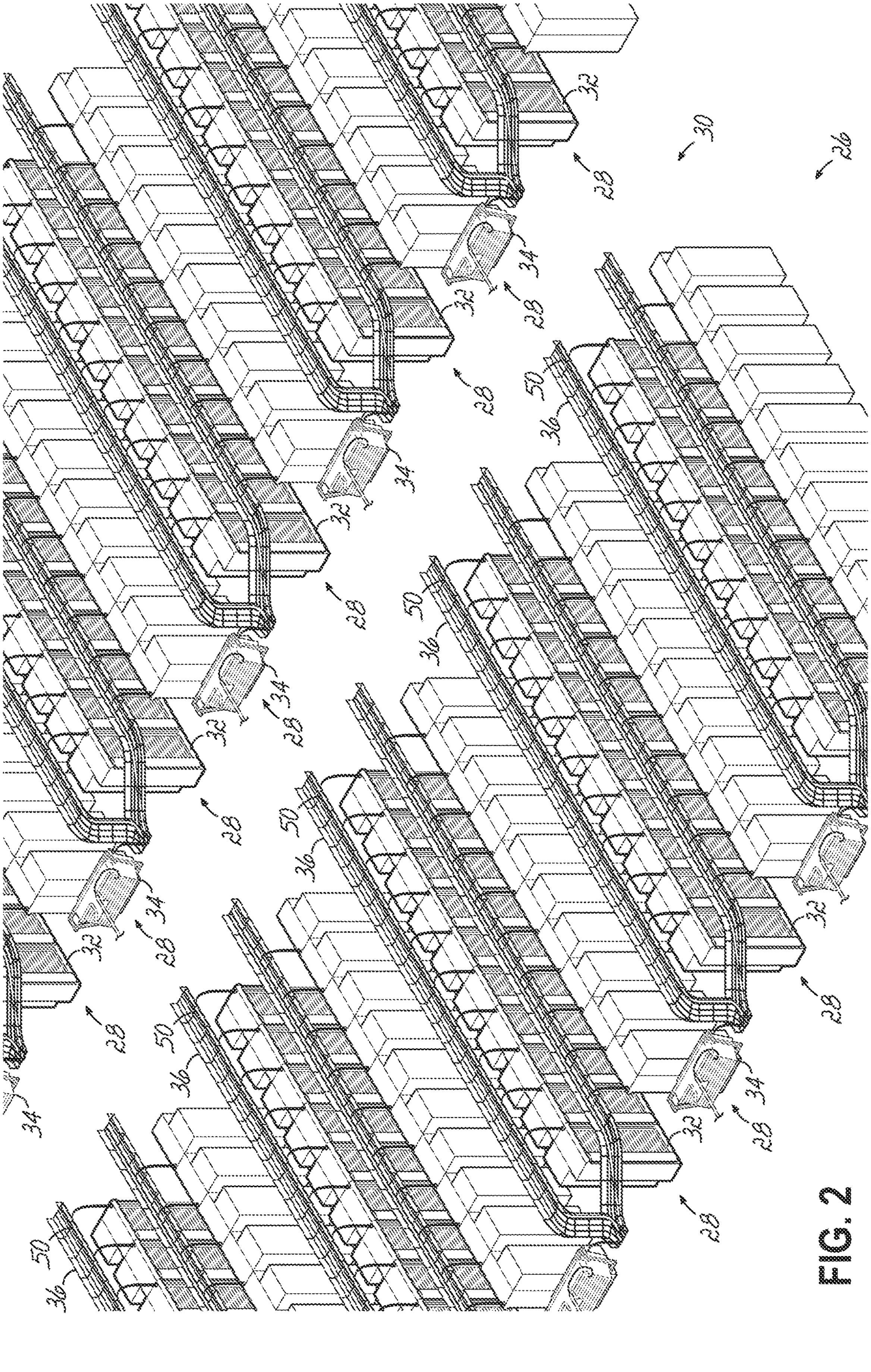
FIG. 2 is partial perspective view of an exemplary data hall of the data center shown in FIG. 1 according to one embodiment.
Figure 3:
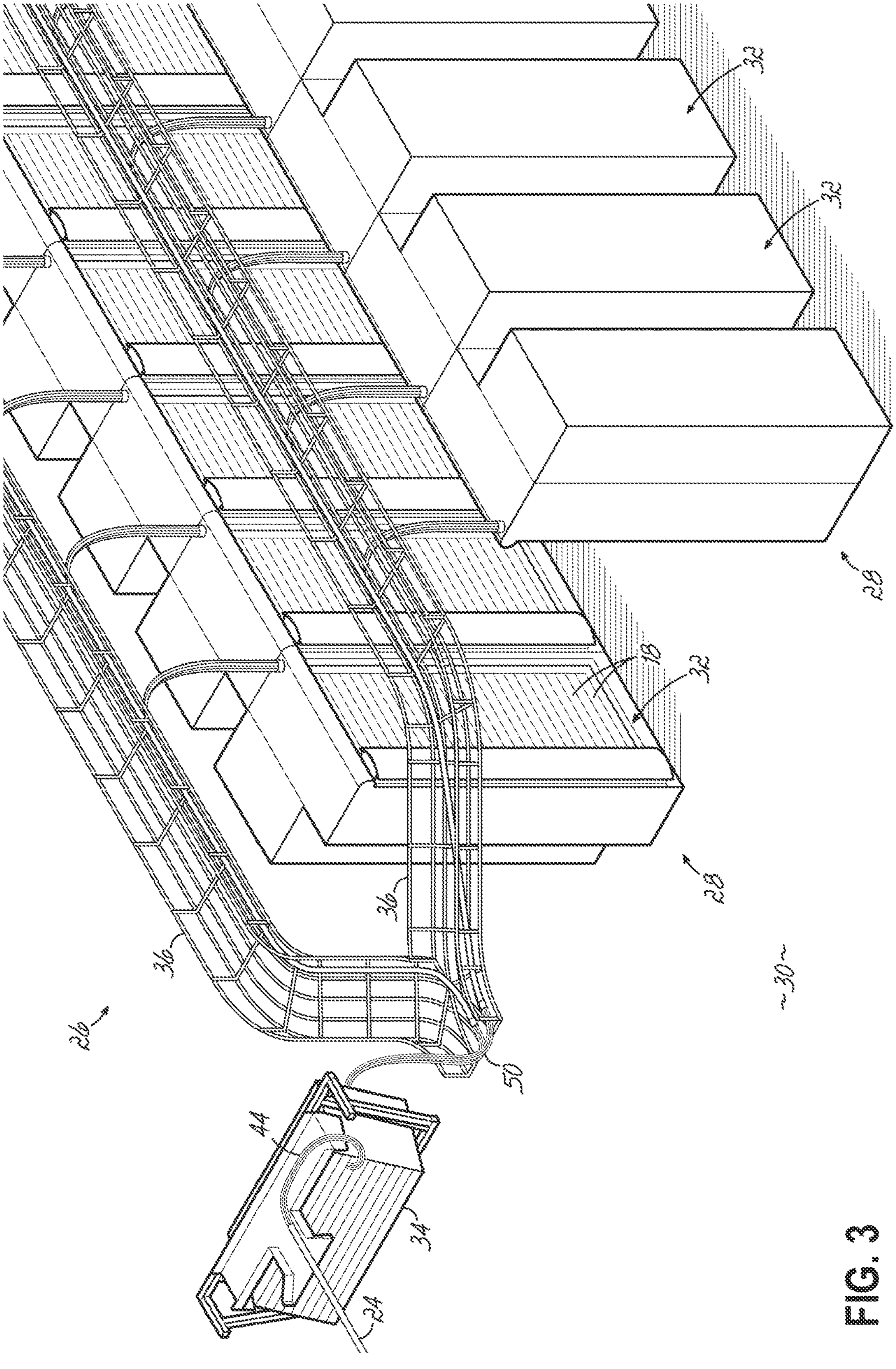
FIG. 3 is an enlarged partial perspective view of the exemplary data hall shown in FIG. 2.

As illustrated in more detail in FIGS. 2 and 3, the network equipment 18 in the main building 12 or an auxiliary building 14 may be arranged in one or more data halls 26 that generally include a plurality of spaced-apart rows 28 on one or both sides of an access pathway 30. The arrangement of the data halls 26 into rows 28 helps organize the large number of equipment, fiber optic cables, fiber optic connections, etc. Each of the rows 28 includes a plurality of equipment racks or cabinets 32 (referred to hereafter as "racks 32") generally arranged one next to the other along the row 28. Each of the racks 32 is a vertically arranged framework for holding various network equipment 18 of the data center 10, as is generally known in the telecommunications industry. In one common arrangement, and as further illustrated in FIG. 2, each row 28 may include an intermediate distribution frame 34 (also referred to as a main patch panel) at the head end of the row 28 closest to the access pathway 30. Although the intermediate distribution frame 34 is shown as being positioned above the row 28, in other embodiments the intermediate distribution frame may be in a cabinet (not shown) at the head end of the row 28 or in the first rack 32 at the head end of the row 28. In yet other embodiments, the intermediate distribution frame 34 may be located within the associated row, such as in the middle of the row, and be above, below, or within one of the racks 32. In one exemplary arrangement, a cable tray 36 extends above and along the rows of equipment racks 32. A pair of the cable trays 36 may converge in a "Y" configuration to the intermediate distribution frame 34. As will be discussed in more detail below and as shown in FIG. 3, a plurality of hall distribution cables 44 may enter the intermediate distribution frame 34 on one side and row distribution cables 50 may enter the intermediate distribution frame 34 from the other side. The row distribution cables 50 are positioned in the cable trays 36 and where appropriate a subset of the row distribution cables 50 drop down and enter a particular equipment rack 32 and connect to network equipment 18 inside the equipment rack 32.

Figure 4:
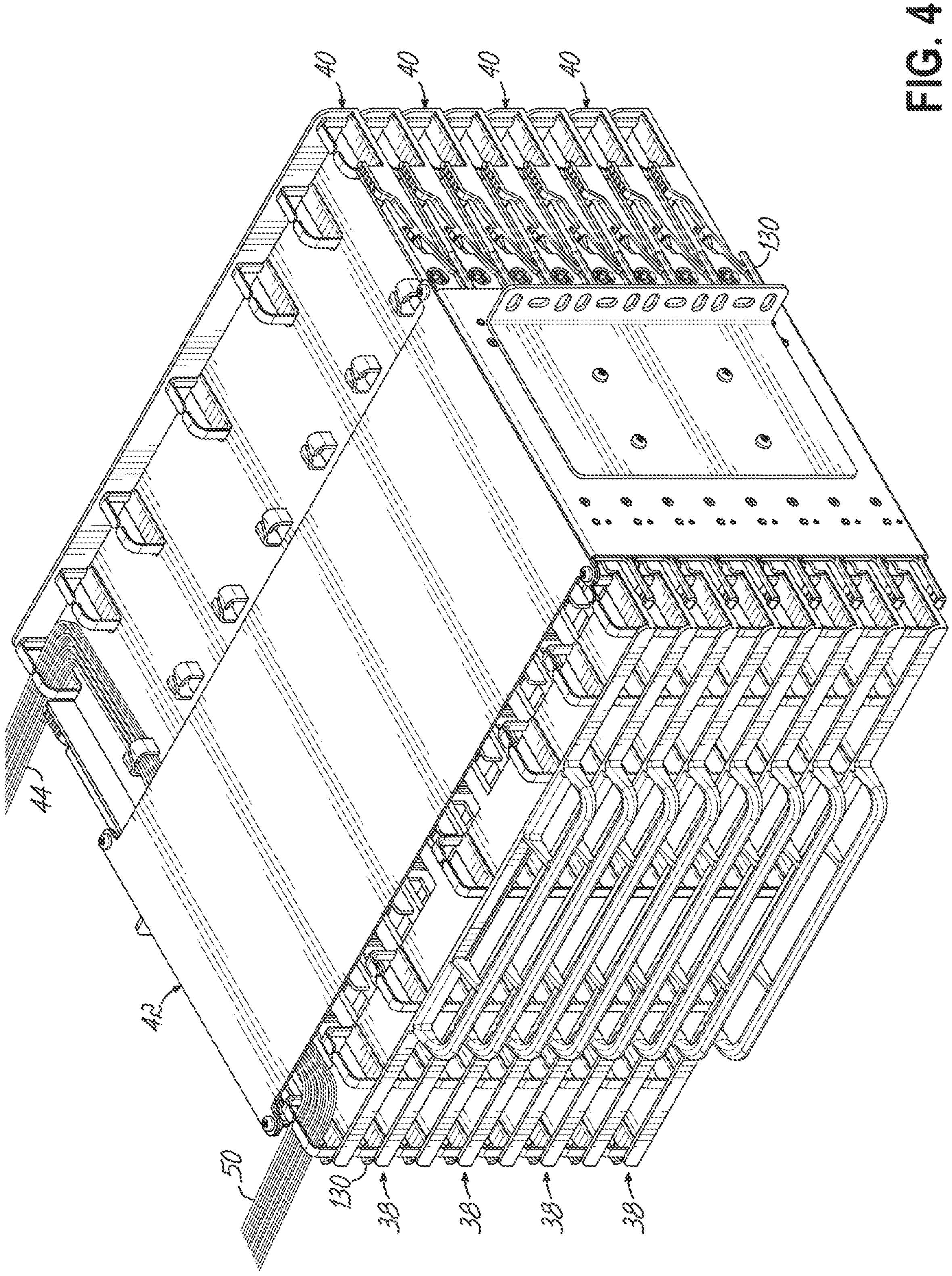
FIG. 4 is a perspective view of an intermediate distribution frame with eight trays according to an exemplary embodiment of the disclosure.

With reference to FIG. 4, the intermediate distribution frame 34 may include one or more tray assemblies 38 according to an embodiment of the invention. FIG. 4 illustrates eight separate tray assemblies 38 surrounded by a housing shell 42 for supporting the tray assemblies 38 in intermediate distribution frame 34. Each of the tray assemblies 38 may slide into the housing shell 42 from the front or the back independent of each other. In one embodiment, and as briefly mentioned above, a plurality of hall distribution cables 44 enter a back portion 46 of the tray assembly 38 and connect to one end (back) of an adaptor assembly 88 (FIG. 5) that is formed from a plurality of individual adapters 48. Similarly, corresponding row distribution cables 50 enter a front portion 52 of the tray assembly 38 and connect to a corresponding end (front) of that same adaptor assembly 88. In use, signals from the network equipment 18 in the racks 32 are transmitted through the row distribution cables 50, and into the hall distribution cables 50 at the adaptor assembly 88, and vice versa. In other words, the information may travel in both directions (bi-directional) along the hall distribution cables 44 and the row distribution cables 50.

Figure 5:
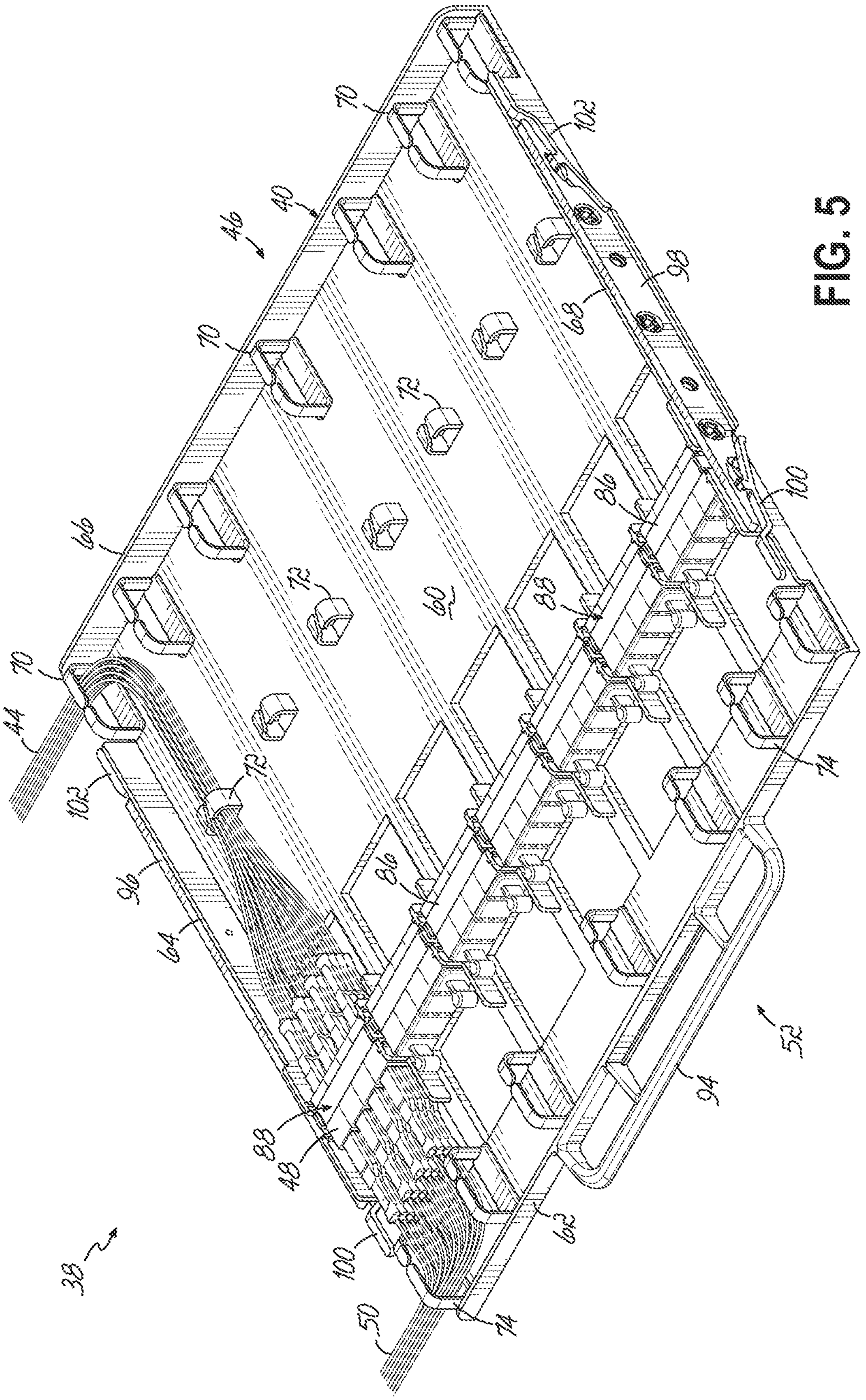
FIG. 5 is a perspective view of a tray according to an exemplary embodiment of the disclosure.

An exemplary individual tray assembly 38 is illustrated in FIG. 5. The tray assembly 38 includes a tray 40 having a bottom panel 60 with adjoining first, second, third, and forth walls 62, 64, 66, 68. For purposes of orientation only, the first wall 62 may be considered at the front of the tray 40, the second wall 64 may be considered at the left of the tray 40, the third wall 66 may be considered at the back of the tray 40, and the fourth wall 68 may be considered at the right of the tray 40. The tray assembly 38 also includes a plurality of cable routing guides 70, 72, 74, which help secure the hall distribution cables 44 and the row distribution cables 50 in a desired routing as those distribution cables 44, 50 enter the back and front portions 46, 52 of the tray assembly 38. This allows, for example, the cables 44, 50 to be connected to the adapters 48 in an orderly fashion.

Figure 6:
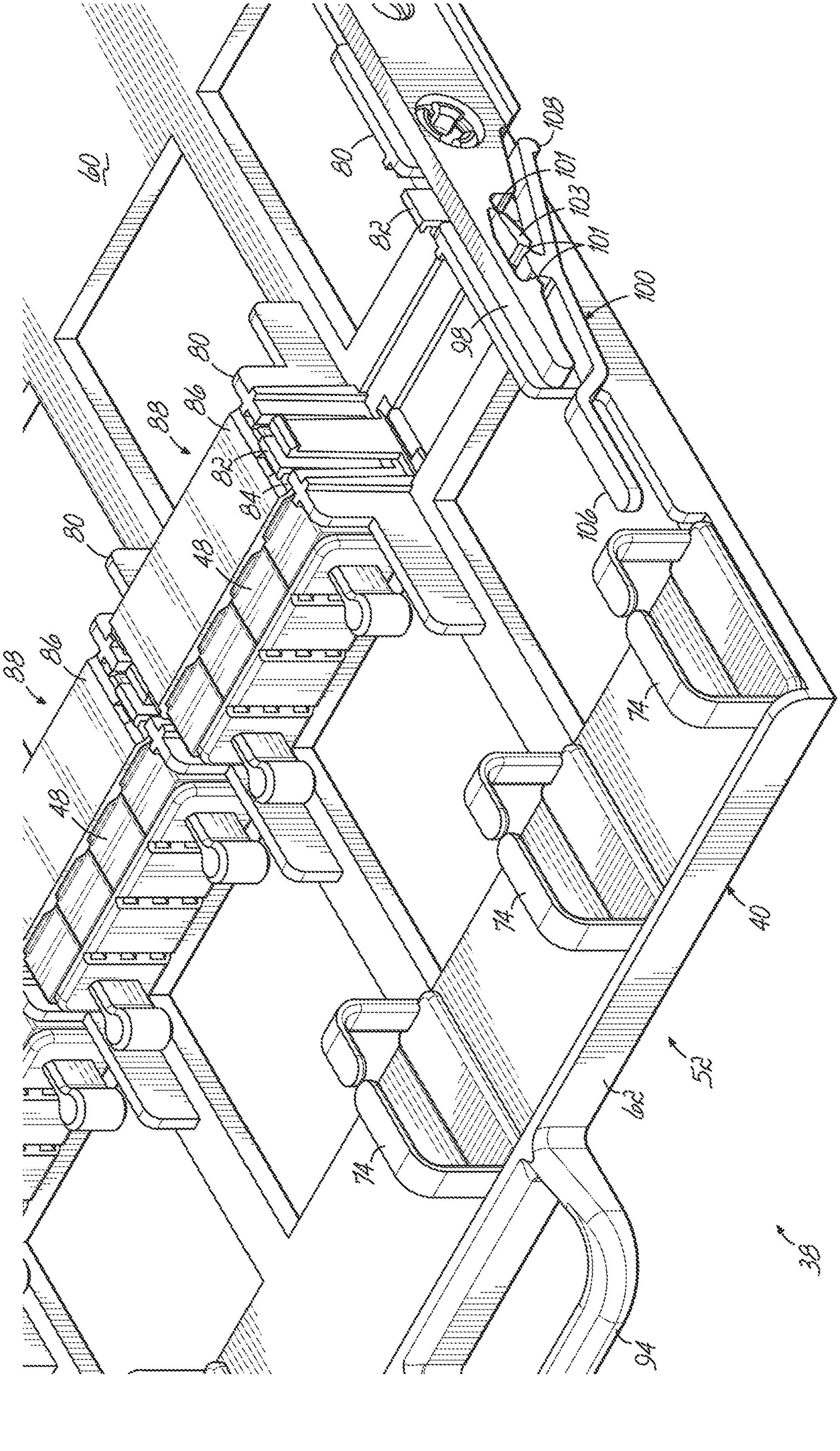
FIG. 6 is an enlarged partial perspective view of the tray of FIG. 5.

In the exemplary embodiment of the tray assembly 38, up to seven adaptor assemblies 88 may be coupled to the tray assembly 38. In other embodiments, a tray assembly 38 may be configured to hold less than seven adaptor assemblies 88 or more than seven adapter assemblies 88. As shown in FIG. 6, the tray 40 may include cooperating pairs of retainers 80 that extend from the bottom panel 60 of the tray 40. One pair of retainers 80 serves to removably hold one of the adapter assemblies 88 in place. Each retainer 80 may include a retaining member 82 that is configured to engage a notch or recess 84 in a band 86 that wraps around four adapters 48 (or other numbers of adapters 48) to form the adapter assembly 88 (e.g., in a snap fit). When the retaining member 82 engages the notch or recess 84, the adapter assembly 88 is positively secured to the tray 40. The retainers 80 are flexible so that they may be spread apart in order to disengage the retaining member 82 from the notch or recess 84 so as to release the adapter assembly 88 from the tray 40. Other retainers with different configurations may also be used to retain the adapter assemblies 88.

Figure 7:
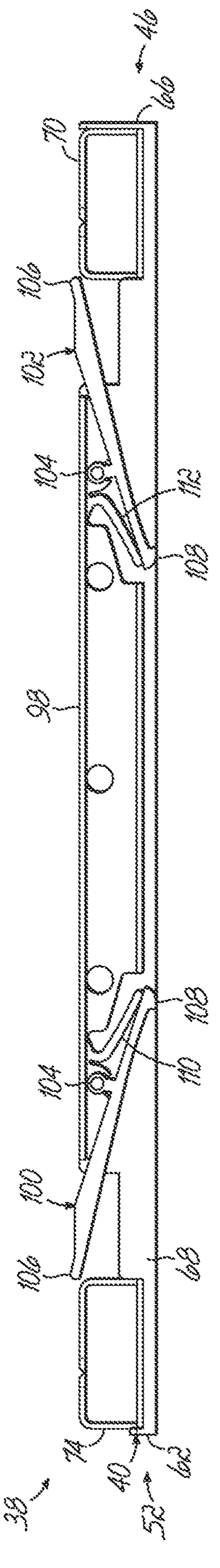
FIG. 7 is an elevational view of a tray according to an exemplary embodiment of the disclosure.

The tray assembly 38 may also include a handle 94 as illustrated in FIG. 5. In this embodiment, the handle 94 is mounted to the first (front) wall 62. The tray assembly 38 may also include first and second tray rails 96, 98 mounted to the second and fourth walls 64, 68, respectively. Thus, the first tray rail 96 may be considered at the left of the tray 40 and the second tray rail 98 may be considered at the right of the tray 40. Each tray rail 96, 98 includes a first and a second, lever-action latch or trigger 100, 102, which is operatively connected to each tray rail 96, 98. In one exemplary embodiment shown in FIGS. 5 and 6, each lever-action latch 100, 102 is operatively connected to each respective tray rail 96, 98 with a living hinge assembly. In that regard, each lever-action latch 100, 102 may be integrally formed with the tray rails 96, 98. In the embodiment shown, the living hinge assembly includes one or more hinge joints 101 between the lever-action latch and the tray rail 96, 98 and/or one or more linkages 103. The living hinge assembly allows each lever-action latch 100, 102 to move relative to its respective tray rail 96, 98 to permit movement of tray 40, as will be described in further detail below. In another exemplary embodiment shown in FIGS. 7 and 8, each lever-action latch 100, 102 is a separate component that is rotatably mounted on each respective tray rail 96, 98 with a fastener 104, for example. In either case, for orientation purposes only, the first, lever-action latch 100 may be considered mounted at the front of each tray rail 96, 98 and the second, lever-action latch 102 may be considered mounted at the back of each tray rail 96, 98.

Each of the first and second lever-action latches 100, 102 includes a first end 106 and an opposite second end 108. The first end 106 is configured to be engaged by a hand or digit thereof to rotate the first or second lever-action latches 100, 102 about a rotational axis that may be defined by the living hinge assembly or fastener 104, for example. The second end 108 is configured to engage with one or more holes or recesses, which will be described in more detail below. In the embodiment shown in FIGS. 7 and 8, each tray rail 96, 98 may include first and second biasing members 110, 112 associated with first and second lever-action latches 100, 102, respectively. In one embodiment, the first and second biasing members 110, 112 may be made of a flexible material that is integrally formed with the tray rails 96, 98. At rest, the first and second biasing members 110, 112 engage the first and second, lever-action latches 100, 102 so as to move the second end 108 downwardly, i.e., away from the first and second tray rails 96, 98. While the first and second biasing members 110, 112 are flexible members in the embodiment illustrated in FIGS. 7 and 8, the first and second biasing members 110, 112 may take other forms such as different types of springs, such as helical compression springs, helical extension springs, torsion springs, coil springs, or plate springs, for example. In the embodiment shown in FIGS. 5 and 6, the living hinge arrangement, and in particular the linkage 103 is the biasing member that provides the biasing force on each lever-action latch 100, 102 to move the second end 108 downwardly.

Figure 9:
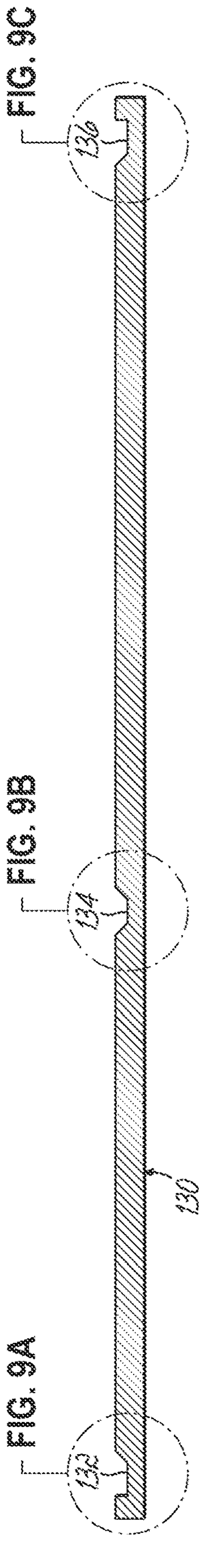
FIG. 9 is an enlarged view of the housing rail of FIG. 8.
Figure 9A:
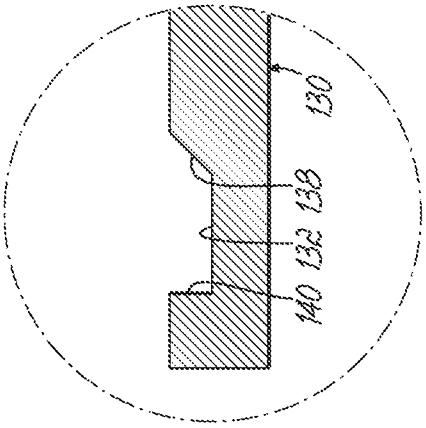
FIGS. 9A, 9B, and 9C are enlarged views of the recesses in the housing rail of FIG. 8 with the lever-action latches disengaged from the recesses in FIGS. 9B and 9C.
Figure 9B:
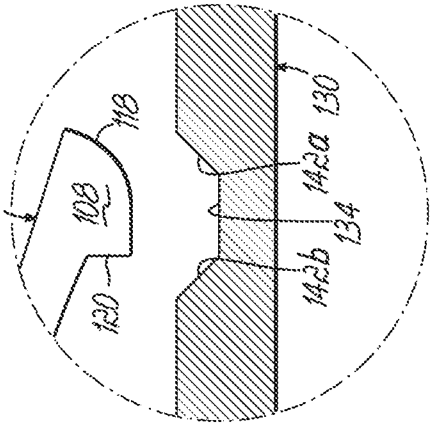
Figure 9C:
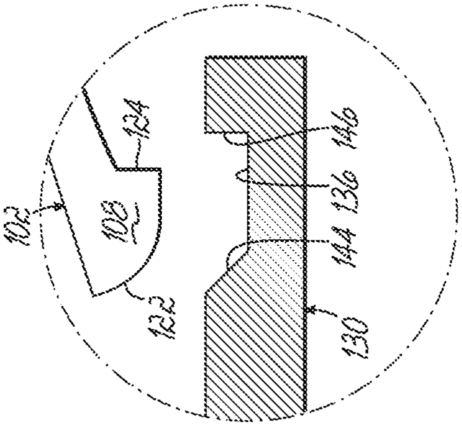

With reference to FIGS. 9B and 9C, the second end 108 of the first lever-action latch 100 has a sloped profile 118 on its rear side while its forward side has a notched profile 120. The second end 108 of the second lever-action latch 102 has a sloped profile 122 on its forward side while its rear side has a notched profile 124.

Figure 8:
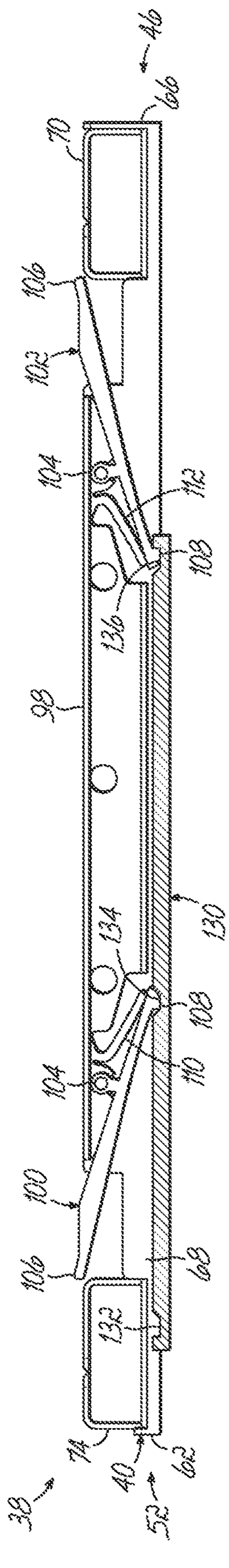
FIG. 8 is an elevational view of the tray of FIG. 7 engaged with a housing rail.

The housing shell 42 may include a pair of housing rails or slides 130 on opposite sides of the housing shell 42 as illustrated in FIG. 4. The housing rails 130 are configured to receive a single tray assembly 38. The housing shell 42 may be sized to accommodate one or more trays 40 with a corresponding number of pairs of housing rails or slides 130. Thus, while the housing shell 42 in FIG. 4 is sized to accommodate eight tray assemblies 38 and, therefore, have eight pairs of housing rails 130, the housing shell 42 may be sized to accommodate less or more than eight tray assemblies 38. With reference to FIGS. 8 and 9, each housing rail 130 may include one or more indentations or recesses to receive the second ends 108 of the first and second lever-action latches 100, 102. In one embodiment, each housing rail 130 may include a first, second, and third recesses 132, 134, 136. For orientation purposes only, the first recess 132 may be considered at a front section of the housing rail 130, the second recess 134 may be considered in a middle section of the housing rail 130, and the third recess 136 may be considered at a rear section of the housing rail 130. As depicted in FIGS. 9 and 9A, the first recess 132 has a sloped profile 138 on its rear side and a notched profile 140 of its forward side. The second recess 134 has a sloped profile 142*a*, 142*b* on both its rear and forward sides. The third recess 136 has a sloped profile 144 on a forward side and a notched profile 146 on a rear side.

Figure 10A:
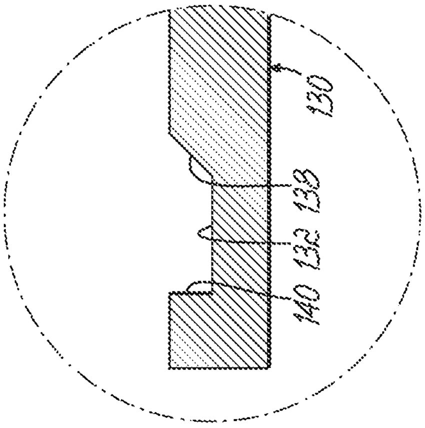
FIGS. 10A, 10B, and 10C are enlarged views of the recesses in the housing rail of FIG. 8 with the lever-action latches engaged with the recesses in FIGS. 10B and 10C.
Figure 10B:
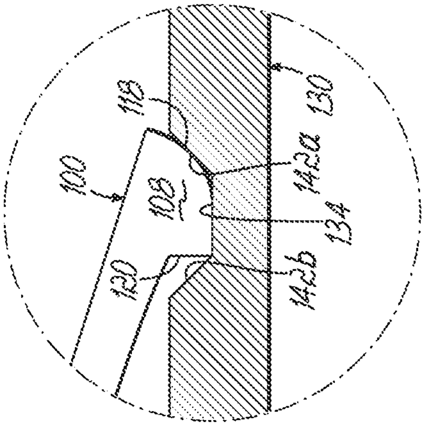
Figure 10C:
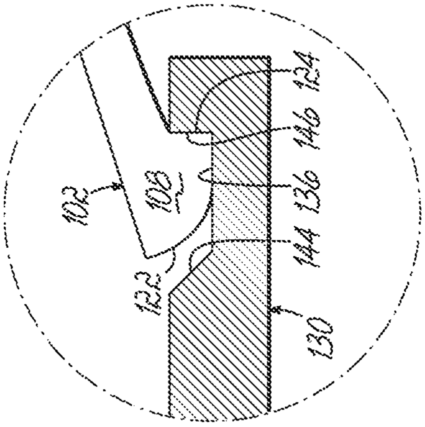
Figure 11A:
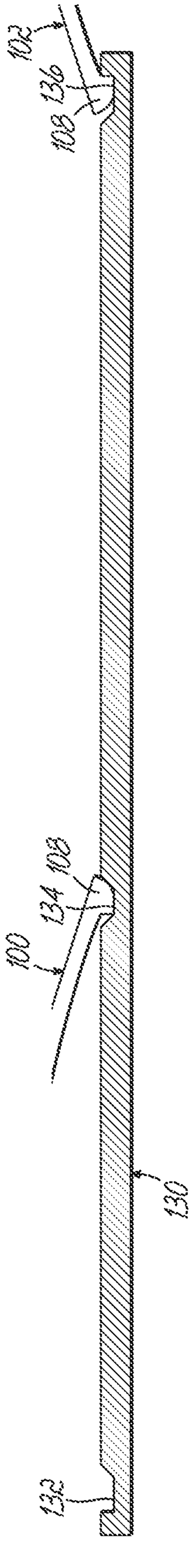
FIG. 11A is a schematic representation of the tray in the resting position with the first and second, lever-action latches in the middle and rear recesses in the housing rail.

In use, the tray assembly 38 may be slid into the housing shell 42 along the pair of housing rails 130 from either the back side of the housing shell 42 or the front side. The tray 40 may be placed in at least three discrete positions along the housing rails 130. For example, the tray assembly 38 may be placed in a "resting position" which corresponds to when the tray assembly 38 is in its normal, operative position as shown in FIGS. 8 and 11A. In the resting position, the second ends 108 of the first and second lever-action latches 100, 102 are positioned within recesses 134, 136, respectively, as shown in FIGS. 8, 10B, 10C, and 11A.

Figure 11B:
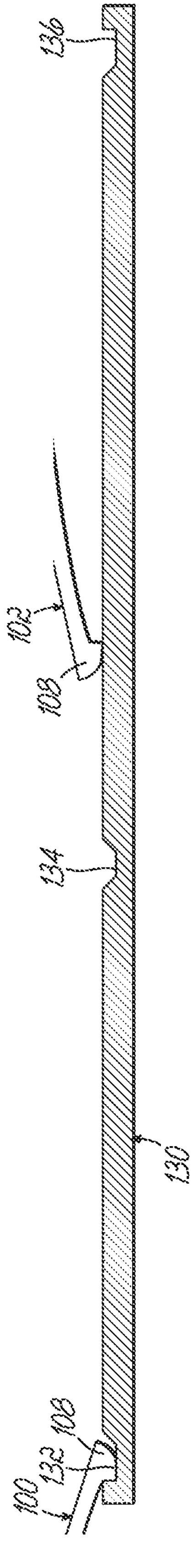
FIG. 11B is a schematic representation of the tray in the forward, extended position with the first, lever-action latch engaging the forward recess in the housing rail.
Figure 11C:
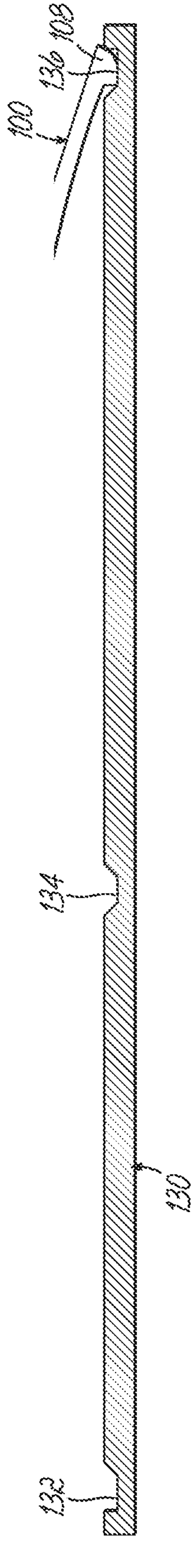
FIG. 11C is a schematic representation of the tray in the rearward, extended position with the first, lever-action latch in the rear recess in the housing rail.

Starting at the resting position, a technician may pull the tray assembly 38 forward using the handle 94. Because the recesses 134, 136 have sloped profiles 142*b*, 144 on their respective front sections, a technician may pull the tray assembly 38 forward without having to press down on the first end 106 of the first, lever-action latches 100 on both sides of the tray 40. The second ends 108 simply glide over the sloped profiles 142*b*, 144 as the technician pulls the tray assembly 38 forward. As the technician continues to pull the tray assembly 38 forward, the notched profile 120 of the second end 108 of the first, lever-action latch 100 will eventually engage the notched profile 140 on the first recess 132 as shown in FIG. 11B. This configuration may be considered a "forward, extended position". The notched profile 140 of the first recess 132 may serve as a stop so that the technician does not inadvertently pull the tray assembly 38 all the way out of the housing shell 42. In the forward, extended position, the technician may have access to the front end of the adapter assemblies 88 as well as the individual adapters 48. As such, the technician may connect or disconnect the row distribution cables 50 to or from the adapters 48 as needed. To remove the tray assembly 38 in the forward, extended position from the housing shell 42, the technician must press down on the first end 106 of the first lever-action latch 100 so as to disengage the notched profile 120 of the second end 108 from the notched profile 140 of the first recess 132.

From the forward, extended position, the technician may push the tray assembly 38 rearwardly back into the housing shell 42. As the technician continues to push the tray assembly 38 rearwardly, the second end 108 of the first, lever-action latch 100 will drop into the second recess 134 and the second end 108 of the second, lever-action latch 102 will drop into the third recess 136 returning the tray assembly 38 to its resting position as shown in FIGS. 8 and 11A. The notched profile 146 of the third recess 136 will serve as a stop when engaged by the notched profile 124 of the second end 108 of the second, lever-action latch 102 such that the technician can no longer push the tray assembly 38 any further rearward without pushing down on the first end 106 of the second, lever-action latch 102 to disengage the notched profile 124 of the second end 108 from the notched profile 146 of the third recess 136 as shown in FIG. 9C.

Starting at the resting position, the technician may also pull the tray assembly 38 rearwardly. In the resting position, the notched profile 124 of the second end 108 of the second, lever-action latch 102 engages the notched profile 146 of the third recess 136 as shown in FIGS. 8, 10C, and 11A. In this configuration, the complimentary notched profiles 124, 146 serve as a stop such that the tray assembly 38 cannot move rearwardly from the resting position until the first end 106 of the second, lever-action latch 102 is pushed downwardly so as to disengage the complimentary notched profiles 124, 146. When they are disengaged (FIG. 9C), the technician may pull the tray assembly 38 rearwardly. As the technician continues to pull the tray rearwardly, the second end 108 of the first, lever-action latch 100 will drop down into the third recess 136. Because the second end 108 has a sloped profile 118 on its rearward section, it will not positively engage the notched profile 146 of the third recess 136. As such, the notched profile 146 may not serve as a stop as the technician pulls the tray assembly 38 rearwardly. Instead, the third recess 136 may provide some pulling resistance when the second end 108 of the first, lever-action latch 100 drops into the third recess 136 thereby providing essentially an indexing function instead of a stop function. In other words, the technician will recognize when second end 108 of the first, lever-action latch 100 drops into the third recess 136 by the increased pulling resistance and may stop pulling so as to leave the tray assembly 38 in the housing shell 42. This configuration may be considered the "rearward, extended position".

From the rearward, extended position, the technician may push the tray assembly 38 forward without having to push down on the first end 106 of the first, lever-action latch 100 because the sloped profile 144 of the third recess 136 will permit the notched profile 120 of the second end 108 to simply glide over the sloped profile 144. As the technician continues to push the tray assembly 38 forward, the second end 108 of the first, lever-action latch 100 will drop into the second recess 134 and the second end 108 of the second, lever-action latch 102 will drop into the third recess 136 putting the tray in the resting position (FIG. 8). Neither the second or third recesses 134, 136 will serve has stops as the tray assembly 38 is pushed in the forward direction, but the technician will feel increased pushing resistance and recognize the tray assembly 38 is in the resting position. Although the second and third recesses 134, 136 do not serve as stops as the tray assembly 38 is being pushed forward from the rearward, extended position, the second and third recesses 134, 136 do serve an indexing function to inform the technician when the tray assembly 38 is in the resting position.

In one embodiment, the housing shell 42 may accommodate eight tray assemblies 38; with each tray assembly 38 accommodating seven adapter assemblies 88; with each adapter assembly 88 having four adapters 48; where each adapter 48 may receive four individual cables 44, 50 on either side of each adapter 48; and where each cable 44, 50 contains 24 fibers. In this embodiment, there are a total of 112 adapters 48, thus 112 cables coming into one side of the adapters 48 for a total of 2,688 fibers on one side of the adapters 48. There would be another 2,688 corresponding fibers coming into the other side of the adapters 48. Thus, in this embodiment, each tray assembly 38 is considered to contain 2,688 fiber connections. For a housing shell 42 having eight tray assemblies 38, there would be 21,504 fiber connections. In other embodiments, the number of fiber connections being made in the tray assembly 38 may vary depending on how many adapters 48 are in an adapter assembly 88, how many adapter assemblies 88 are installed in a given tray assembly 38, and how many fibers are in the cables 44, 50.

During the initial assembly of an exemplary data hall 26, the equipment racks 32 are installed to form parallel rows as generally illustrated in FIGS. 2 and 3. The equipment racks 32 are installed so that the "cool side" of each equipment rack 32 faces the "cool side" of an opposing equipment rack 32. In one embodiment, a technician routes a plurality of the hall distribution cables 50 to one of the intermediate distribution frames 34 that may include at least two housing shells 42 arranged adjacent to other. Each housing shell 42 may contain eight tray assemblies 38. Twenty-eight hall distribution cables 50 may be connected to one of the adapter assemblies 88 which includes four adapters 48 with each adapter 48 configured to receive four cables 50. With the tray assembly 38 in the resting position, the technician first pushes down on the first end 106 of the second, lever-action latch 102 to release the tray assembly 38 from the housing rail 130 (FIG. 9C) and pulls the tray assembly 38 out to the rear, extended position. A subset of the hall distribution cables 44 may be pre-connected to one of the adapter assemblies 88. To install that subset of the hall distribution cables 44 pre-connected to the adapter assembly 88, the technician may route the hall distribution cables 44 through the cable routing guides 70, 72 and snap the adapter assembly 88 into a pair of the retainers 80 so as to secure that adapter assembly 88 to the tray assembly 38. The technician repeats this process until up to seven of the adapter assemblies 88 with the pre-connected hall distribution cables 44 are routed through the cable routing guides 70, 72 and snapped into the retainers 80.

With all the adapter assemblies 88 snapped into place, the technician may then push the tray assembly 38 back into the housing shell 42. The technician may repeat this process until all the hall distribution cables 44 and the corresponding adapter assemblies 88 are installed in each of the tray assemblies 38 associated with a particular housing shell 42. The technician may complete the installation of all the hall distribution cables 44 in the housing shells 42 in the plurality of intermediate distribution frames 34 in the main building 12 before connecting the row distribution cables 50 into the adapter assemblies 88. Alternatively, the technician may complete the installation of the hall distribution cables 44 in all the tray assemblies 38 in a given housing shell 42 and then connect the row distribution cables 50 into the adapter assemblies 88 in the tray assemblies 38 in that given housing shell 42. In other words, the technician may complete the installation of the hall distribution cables 44 and the row distribution cables 50 in a set of tray assemblies 38 for a given housing shell 42 before moving to the next set of tray assemblies 38 in another housing shell 42.

To install the row distribution cables 50, the technician may grab the handle 94 and pull the tray assembly 38 from its resting position forward to the forward, extended position. As discussed above, the technician may pull the tray assembly 38 forward from the resting position without having to move the first, lever-action latch 100 because the sloped profiles 142*b*, 144 permit the second ends 108 of the first and second, lever-action latches 100, 102 to glide over the sloped profiles 142*b*, 144. In the forward, extended position, the technician has access to the "front" side of the adapter assemblies 88 and, therefore, may readily connect the row distribution cables 50 to the individual adapters 48 in the adapter assemblies 88. The technician may also route the row distribution cables 50 through the cable routing guides 74. After the technician finishes installing the row distribution cables 50, the technician may push the tray assembly 38 rearwardly until the tray assembly 38 is in the resting position.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The disclosure in its broader aspects is therefore not limited to the specific details, representative apparatus and methods and illustrative examples shown and described. Accordingly, departures may be made from such details without departing from the scope of the disclosure.

What is claimed is:

1. A tray assembly for organizing cables, comprising:

a tray;

at least one retainer coupled to the tray and configured to receive and retain an adapter assembly; and at least one tray rail coupled to the tray, the tray rail having a first latch and a second latch, each of the first and second latches having a first end and a second end with a pivot point there between, the tray rail having first and second biasing members for biasing the second end of the first and second latches, respectively, downwardly away from an upper edge of the tray rail to an engaged position, wherein the respective first ends are movable to move the respective second ends to a disengaged position.

2. The tray assembly of claim 1, wherein the at least one retainer includes two opposed retainers coupled to the tray, each of the two retainers having a retainer member configured to engage opposing sides of the adapter assembly.

3. The tray assembly of claim 1, further comprising a plurality of cable routing guides configured to retain at least one cable connected to the adapter assembly.

4. The tray assembly of claim 1, wherein the biasing member is a flexible member integrally formed in the tray rail.

5. The tray assembly of claim 1, wherein the second end of the first latch has a notched profile on a forward side and a sloped profile on a rear side and wherein the second end of the second latch has a sloped profile on a forward side and a notched profile on a rear side.

6. An intermediate distribution frame for organizing cables, comprising:

a housing shell;

at least one housing rail coupled to the housing shell, each housing rail having at least one recess;

a tray assembly including:

a tray;

at least one retainer coupled to the tray and configured to receive and retain an adapter assembly; and at least one tray rail coupled to the tray, the tray rail having a first latch and a second latch, each of the first and second latches having a first end and a second end with a pivot point therebetween, the tray rail having first and second biasing members for biasing the second end of the first and second latches, respectively, downwardly away from an upper edge of the tray rail to an engaged position relative to the at least one recess, wherein the respective first ends are movable to place the respective second ends in a disengaged position relative to the at least one recess, wherein the tray is moveable along the at least one tray rail such that at least one of the second ends of the first and second latches engages the at least one recess as the tray moves along the at least one tray rail.

7. The intermediate distribution frame of claim 6, wherein the at least one recess on the at least one housing rail includes first, second, and third spaced apart recesses, wherein the tray is moveable between a first extended position, a resting position, and a second extended position, wherein in the first extended position the second end of the first latch is disposed within the first recess, wherein in the resting position the second end of the first latch is disposed within the second recess and the second end of the second latch is disposed within the third recess, and wherein in the second extended position the second end of the first latch is disposed within the third recess.

8. The intermediate distribution frame of claim 7, wherein the at least one tray rail has a front section, a middle section, and a rear section, the first recess being located in the front section, the second recess being located in the middle section, and the third recess being located in the rear section.

9. The intermediate distribution frame of claim 8, wherein each of the second ends of the first and second latches has forward and rear sides and wherein each of the first, second, and third recesses have respective front and rear sides, wherein second end of the first latch has a notched profile on its forward side and a sloped profile on its rear side and wherein the second end of the second latch has a sloped profile on its forward side and a notched profile on its rear side, and wherein the first recess has a notched profile on its forward side and a sloped profile on its rear side, wherein the second recess has a sloped profile on its forward side and rear side, and wherein the third recess has a sloped profile on its forward side and a notched profile on its rear side.

10. The intermediate distribution frame of claim 9, wherein when the tray is in the first extended position, the notched profile of the second end of the first latch engages the notched profile of the first recess such that the tray is restricted from moving further forward without disengaging the second end of the first latch from the first recess, and wherein when the tray is in the resting position, the notched profile of the second end of the second latch engages the notched profile of the third recess such that the tray is restricted from moving further rearward without disengaging the second end of the second latch from the third recess.

11. A method for installing cables in an intermediate distribution frame, comprising:

providing an intermediate distribution frame, the intermediate distribution frame having a housing shell, at least one housing rail coupled to the housing shell, and a tray moveable along the housing rail, the tray having at least one retainer configured to receive and retain an adapter assembly and having a tray rail having at least one latch configured to engage the housing rail to fix the tray in a position relative to the housing rail, the at least one latch having a first end and a second end with a pivot point therebetween;

moving the tray in a first direction at least partially out of one side of the housing shell;

installing an adapter assembly having cables attached to one side of the adapter assembly into the at least one retainer; and moving the tray in a second direction opposite the first direction so as to position the tray back into the housing shell.

12. The method of claim 11, further comprising:

prior to moving the tray in the first direction, releasing the latch from the housing rail; and moving the tray in the first direction to an extended position.

13. The method of claim 11, further comprising:

moving the tray in the second direction at least partially out of the opposite side of the housing shell;

connecting cables to the opposite side of the adapter assembly; and moving the tray in the first direction to position the tray back into the housing shell.

14. The method of claim 13, wherein the tray includes a tray rail having at least one latch configured to engage the housing rail to fix the tray in a position relative to the housing rail, wherein moving the tray in the second direction includes moving the tray in the second direction until the at least one latch engages the housing rail to restrict further movement of the tray in the second direction.

* * * * *